(12) United States Patent
Khayms et al.

(10) Patent No.: US 10,696,424 B2
(45) Date of Patent: Jun. 30, 2020

(54) SPACECRAFT STRUCTURES INCORPORATING GRAPHENE AND OPERATION THEREOF

(71) Applicant: LOCKHEED MARTIN CORPORATION, Bethesda, MD (US)

(72) Inventors: Vadim Khayms, Sunnyvale, CA (US); Steven W. Sinton, Palo Alto, CA (US); Peter V. Bedworth, Los Gatos, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 346 days.

(21) Appl. No.: 15/196,745

(22) Filed: Jun. 29, 2016

(65) Prior Publication Data
US 2018/0002041 A1   Jan. 4, 2018

(51) Int. Cl.
*B64G 1/10* (2006.01)
*B64G 1/22* (2006.01)
(Continued)

(52) U.S. Cl.
CPC .............. *B64G 1/226* (2013.01); *B64G 1/10* (2013.01); *B64G 1/40* (2013.01); *B64G 1/443* (2013.01); *B64G 1/58* (2013.01); *B64G 1/66* (2013.01)

(58) Field of Classification Search
CPC . B64G 1/226; B64G 1/10; B64G 1/58; B64G 1/40
See application file for complete search history.

(56) References Cited

U.S. PATENT DOCUMENTS

| 7,832,983 | B2 * | 11/2010 | Kruckenberg | B82Y 30/00 415/200 |
| 8,367,178 | B1 * | 2/2013 | Rawal | C09D 5/34 428/117 |

(Continued)

OTHER PUBLICATIONS

J.J. Lopez, et al., "Enhanced resistance of single-layer graphene to ion bombardment," Journal of Applied Physics, 2010, 104326 (4 pages), 107.

(Continued)

*Primary Examiner* — Brian M O'Hara
*Assistant Examiner* — Keith L Dixon
(74) *Attorney, Agent, or Firm* — Morgan, Lewis & Bockius LLP (57) ABSTRACT

Functional components of spacecraft structures can be subject to detrimental impacts by energetic particles produced from an electric propulsion system. A graphene coating applied to a functional component can maintain electrical conductivity upon a surface of the functional component, thereby allowing charge dissipation to take place, while also resisting sputtering erosion resulting from impacts of the energetic particles. Accordingly, spacecraft structures can include an electric propulsion system, a functional component that is at least partially impacted by an outflow of the electric propulsion system, and a graphene coating upon the functional component. Methods for operating such spacecraft structures can include generating an outflow of energetic particles from an electric propulsion system of a spacecraft structure, and at least partially impacting the outflow of energetic particles upon a functional component of the spacecraft structure, where the functional component has a graphene coating thereon.

17 Claims, 2 Drawing Sheets

(51) Int. Cl.
  *B64G 1/40* (2006.01)
  *B64G 1/44* (2006.01)
  *B64G 1/58* (2006.01)
  *B64G 1/66* (2006.01)

(56) References Cited

U.S. PATENT DOCUMENTS

| | | | | |
|---|---|---|---|---|
| 8,715,533 | B2* | 5/2014 | Takagi | B82Y 10/00 |
| | | | | 252/500 |
| 8,757,552 | B1* | 6/2014 | Martin | B64G 1/10 |
| | | | | 244/158.1 |
| 9,656,769 | B2* | 5/2017 | Mazed | B64G 1/62 |
| 2003/0164427 | A1* | 9/2003 | Glatkowski | B64G 1/226 |
| | | | | 244/171.7 |
| 2016/0268016 | A1* | 9/2016 | Yun | H01B 1/24 |
| 2017/0327250 | A1* | 11/2017 | Hickman | B64G 1/242 |

OTHER PUBLICATIONS

R. Munoz, et al, "Fast and non-catalytic growth of transparent and conductive graphene-like carbon films on glass at low temperatures," J. Phys. D: Appl. Phys., 2014, 045305 (9 pages), 47.

S. Watcharotone, et al., "Graphene-Silica Composite Thin Films as Transparent Conductors," Nano Letters, 2007, pp. 1888-1892, 7.

H. A. Becerril, et al., "Evaluation of Solution-Processed Reduced Graphene Oxide Films as Transparent Conductors," ACS Nano, 2008, pp. 463-470, 2.

S.J. Wang, et al., "Fabrication of highly conducting and transparent graphene films," Carbon, 2010, pp. 1815-1823, 48.

S. Yadav, et al, "Effect of annealing over optoelectronic properties of graphene based transparent electrodes," AIP Conference Proceedings, 2016, 020144 (3 pages), 1724.

* cited by examiner

SPACECRAFT STRUCTURES INCORPORATING GRAPHENE AND OPERATION THEREOF

CROSS-REFERENCE TO RELATED APPLICATIONS

Not applicable.

STATEMENT REGARDING FEDERALLY SPONSORED RESEARCH OR DEVELOPMENT

Not applicable.

FIELD

The present disclosure generally relates to graphene and other two-dimensional materials and, more specifically, to graphene coatings for tempering surface exposure to energetic particles.

BACKGROUND

Modern commercial, military, and civil space missions often utilize electric propulsion systems to benefit from the advantages offered by this mode of propulsion. Unlike chemical propulsion systems, which provide very high thrust levels over short durations of time, electric propulsion systems provide capabilities for prolonged low levels of continuous or pulsed thrust. Over time, the prolonged low thrust levels can offer more efficient operation than can chemical propulsion systems, particularly once a mission has entered the low-gravity environment of space. In many instances, the fuel requirements for electric propulsion systems are considerably lower than that of chemical propulsion systems, which can be highly desirable for increasing payload-carrying capabilities of a mission. Alternately, electric propulsion systems can offer considerably longer-term operation than can chemical propulsion systems utilizing similar quantities of fuel.

A number of design variations are available for electric propulsion systems. Regardless of their particular design, electric propulsion systems provide an outflow of high-energy ions or other energetic particles to affect a change in velocity of a spacecraft through conservation of momentum.

The energetic outflow of electric propulsion systems is also one of the primary challenges associated with their use. During operation of electric propulsion systems, the energetic outflow can impinge upon sensitive surfaces (e.g., solar panels or arrays, optical reflectors, sensors, antennas, and the like) of a spacecraft structure. Over time, repeated impacts of energetic particles upon such surfaces can sputter away protective thin-film coatings intended to dissipate charge from the environment, thereby leaving sensitive components susceptible to damage from electrostatic discharge (ESD). Other functional coatings can be similarly affected by repeated impacts of energetic particles. Loss of protective coatings or other similar coatings in this manner can compromise the operability of a spacecraft and ultimately lead to failure of a mission.

To address the foregoing issue, many current spacecraft designs mount the thrusters of an electric propulsion system at locations where their outflow is directed well away from sensitive surfaces. This can be sub-optimal from standpoints of both fuel efficiency and propulsion efficiency. For example, inefficient direction of the thrusters of an electric propulsion system can lead to a significant propellant penalty, ultimately leading to higher mission costs. Alternately, expensive transient protection units (TPUs) can be used to protect sensitive spacecraft components from electrostatic discharge. In fact, when sputtering-induced loss of a protective coating is expected to be unavoidable due to a particular thruster configuration being present, protective coatings are often not utilized at all in favor of TPUs. In either case, the amount of payload that can be transported by the spacecraft is decreased, since extra fuel needs to be carried to account for propulsion inefficiency or to accommodate the added weight of TPUs. Both of these factors can impact the economic viability of a mission. Further, TPUs are by themselves an expensive spacecraft component, and their use can add significantly to mission costs.

In view of the foregoing, the ability to utilize a broader range of thruster configurations in spacecraft incorporating an electric propulsion system would represent a substantial advance in the art. The present disclosure satisfies the foregoing need and provides related advantages as well.

SUMMARY

In some embodiments, the present disclosure describes spacecraft structures including an electric propulsion system, a functional component that is at least partially impacted by an outflow of the electric propulsion system, and a graphene coating upon the functional component.

In some embodiments, the present disclosure describes methods for operating a spacecraft structure incorporating an electric propulsion system. The methods include generating an outflow of energetic particles from an electric propulsion system of a spacecraft structure, and at least partially impacting the outflow of energetic particles upon a functional component of the spacecraft structure. The functional component has a graphene coating thereon.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

The present disclosure is directed, in part, to spacecraft structures including a graphene coating upon a functional component thereof. Without limitation, the graphene coating can provide electrostatic discharge protection and resistance to sputtering-induced losses from the surface of the spacecraft structure. The present disclosure is also directed, in part, to methods for operating an electric propulsion system of a spacecraft structure, in which a functional component of the spacecraft structure is present with a graphene coating thereon.

As discussed above, sputtering-induced erosion of coatings from various components of a spacecraft structure can be problematic when utilizing an electric propulsion system. At the very least, propulsion inefficiencies can be encountered, and more involved protection strategies can be required in some instances, such as the utilization of transient protection units. All of these factors can significantly add to the complexity and cost of performing a mission.

The present inventors discovered that graphene can be utilized to substantially avert many of the difficulties associated with sputtering-induced erosion of protective coatings within various spacecraft structures. Graphene represents an atomically thin layer of carbon in which the carbon atoms reside at two-dimensional lattice positions within a single sheet or a few stacked sheets (e.g., about 20 or less) of fused six-membered carbon rings. Additional functionality such as alcohols, ketones, carboxylic acids, and epoxies can be present at the periphery of the graphene sheet or at defect sites within the lattice. In its various forms, graphene has garnered widespread interest for use in a number of applications, primarily due to its favorable combination of high electrical and thermal conductivity values, good in-plane mechanical strength, atomic level thickness, and unique optical and electronic properties.

With regard to the issues encountered in spacecraft structures, the inventors discovered that graphene displays low sputtering losses when subjected to energetic particles similar to those emitted from an electric propulsion system. Moreover, the electrical conductivity of graphene can help protect sensitive components of a spacecraft structure against electrostatic discharge. Thus, a graphene coating can protect the surface of a spacecraft structure by itself through decreasing sputtering and providing electrostatic discharge protection, or it can similarly protect an existing protective coating upon which it is disposed.

In addition to the foregoing, a sufficiently thin graphene coating can maintain a significant degree of optical transparency when conduction of photons to the surface of a functional component of a spacecraft structure is desired. Thus, graphene coatings can be used to protect solar arrays and similar functional components of a spacecraft structure from erosion promoted by energetic particles emitted from an electric propulsion system. Further, graphene coatings can satisfactorily overcoat conventional indium tin oxide (ITO) coatings used for purposes of maintaining optical transparency. Alternately, graphene coatings can be used to supplant ITO coatings altogether.

A still further advantage afforded by graphene is that this material can be produced in bulk fairly readily and undergo various types of modifications to meet the needs of a particular application. Further, a number of different processes can be used for introducing a graphene coating upon a functional component of a spacecraft structure, as will be discussed in more detail herein. In some instances, a functional component can be robust enough to support direct growth of graphene thereon, such as through a chemical vapor deposition (CVD) process, or the graphene can be grown upon a secondary substrate before undergoing subsequent transfer to the functional component as a conformal coating. Other processes for producing suitable graphene and introducing graphene to the surface of a functional component of a spacecraft structure are also possible and will be discussed in more detail hereinbelow.

Incorporation of a graphene coating upon a functional component of a spacecraft structure, optionally in combination with another charge control coating, can advantageously allow the use of transient protection units to be eliminated or at least decreased. Accordingly, applying a graphene coating upon a functional component of a spacecraft structure can allow some missions to take place that are not currently feasible from a technological standpoint or are not cost effective due to non-optimized thruster configurations. Further, the use of a robust graphene coating for charge control on surfaces that have not been traditionally coated can decrease the risk of electrostatic discharges and their influence upon a vehicle in a space environment. Finally, less development work directed to obtaining suitable thruster configurations may be realized by practicing the disclosure herein.

In various embodiments, spacecraft structures of the present disclosure can include an electric propulsion system, a functional component that is at least partially impacted by an outflow of the electric propulsion system, and a graphene coating upon the functional component. In more particular embodiments, the electric propulsion system can include one or more exhaust source points, wherein at least a portion of the one or more exhaust source points is directed such that the outflow from the one or more exhaust source points at least partially impacts the functional component. For example, the one or more exhaust source points can be pointed toward the functional component in some embodiments of the present disclosure. In some more specific embodiments, the one or more exhaust source points can include one or more exhaust nozzles.

As used herein, the term "functional component" refers to a portion of a spacecraft structure serving in a role that is more than just mechanical in nature. Some functional components that can be protected through use of a graphene coating as described herein include those that collect and convert electromagnetic radiation as part of their functionality. Illustrative functional components within a spacecraft structure that can be protected through use of a graphene coating according to the disclosure herein include, for example, solar panels, solar cells, OSRs (optical solar reflectors), radiofrequency reflectors, gold mesh reflectors, solar arrays, communication arrays, antennas, optical sensors, thermal blankets, the like, and any combination thereof.

Figure 1:
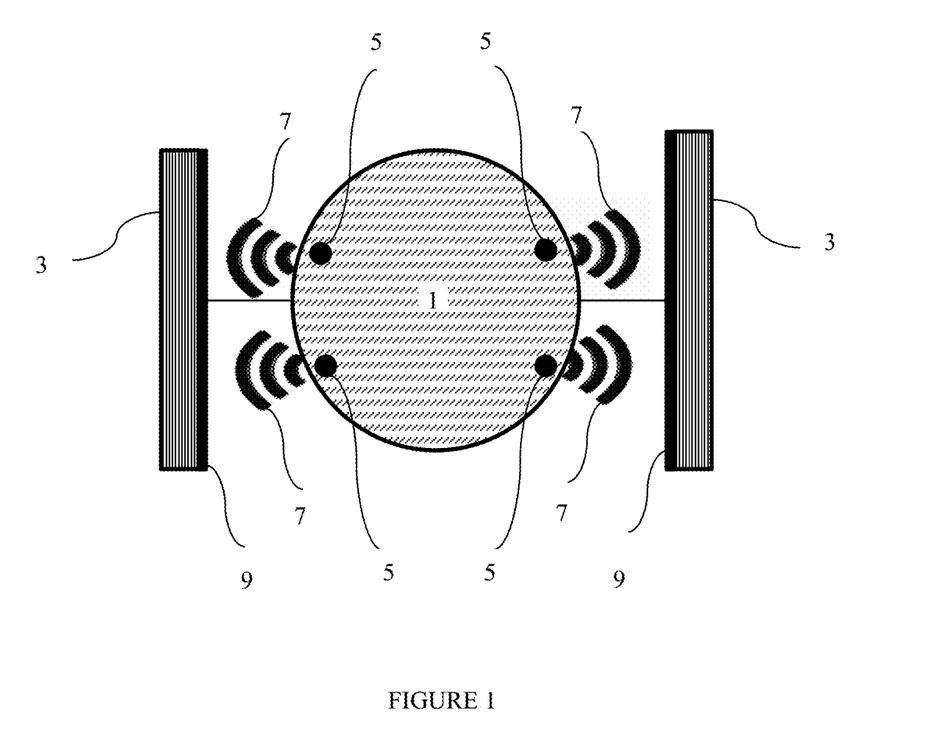
FIG. 1 shows an illustrative schematic of a spacecraft structure incorporating an electric propulsion system and a functional component having a graphene coating thereon.

FIG. 1 shows an illustrative schematic of a spacecraft structure incorporating an electric propulsion system and a functional component having a graphene coating thereon. In particular, FIG. 1 shows satellite 1 having solar panels 3 extending therefrom. Although FIG. 1 has shown satellite 1 as an exemplary spacecraft structure, it is to be recognized that rockets, space stations, and like space vehicles can similarly incorporate the disclosure herein. Accordingly, spacecraft structures that can benefit from the present disclosure include those in orbit (including low earth orbit, medium earth orbit, or geosynchronous orbit) and those that are non-orbiting, such as vehicles involved in interplanetary missions. Likewise, although FIG. 1 has shown solar panels 3 as exemplary functional components, any of the functional components specified herein can be utilized in a particular type and/or configuration of a spacecraft structure. Any of these alternative functional components can similarly be protected with graphene coating 9 upon functional components 3. It should further be recognized that FIG. 1 simply provides a basic illustration of a spacecraft structure incorporating the features described herein such that the present disclosure can be better understood. As will be evident to one having ordinary skill in the art, an actual spacecraft structure would likely have a much more complex set of components, both functional and non-functional, in order to be suited for performing a particular task in a space environment.

With continued reference to FIG. 1, satellite 1 includes exhaust source points 5, which emit outflow 7 from an electric propulsion system (details not shown in FIG. 1). Exemplary electric propulsion systems that can be present are discussed hereinafter. Outflow 7 contains energetic particles, which are used for positioning satellite 1 in a desired manner, such as when maintaining orbit. In related spacecraft structures, outflow 7 can propel the spacecraft structure across distances of space. Due to the positioning of exhaust source points 5 in spacecraft structures of either type, outflow 7 is at least partially directed toward solar panels 3, which would otherwise be damaged thereby were graphene coating 9 not present. As indicated above, there is presently no known solution in the aerospace industry whereby such sputtering-induced damage within a spacecraft structure can be substantially prevented without adding excessive weight that could otherwise be used for carrying a payload. Moreover, currently available solutions utilize relatively thick coatings that are unlikely to be substantially optically transparent.

The type of electric propulsion system incorporated in the various embodiments of the present disclosure is not considered to be particularly limited in nature. In general, any source that emits energetic particles can be suitable for use in this regard. Sputtering associated with impacts of these energetic particles can be mitigated by practicing the disclosure herein. Suitable electric propulsion systems can include any of electrostatic, electrothermal, electromagnetic, or photonic propulsion systems. More particular examples of suitable electric propulsion systems can include, but are not limited to, electrostatic ion thrusters, colloid ion thrusters, contact ion thrusters, field emission electric propulsion thrusters, microwave ion thrusters, plasma ion thrusters, Hall effect thrusters, radioisotope ion thrusters, arcjets, microwave arcjets, resistojets, electrodeless plasma thrusters, magnetoplasmadynamic thrusters, pulsed inductive thrusters, pulsed plasma thrusters, helicon double layer thrusters, and variable specific impulse magnetoplasma thrusters. These types of electric propulsion systems will be familiar to one having ordinary skill in the art and will not be described in greater detail herein.

Graphene coatings can be incorporated upon conventional functional components of a spacecraft structure, which in some cases can have an existing charge control coating already present thereon. As used herein, the term "charge control coating" refers to an electrically conductive coating that mitigates the incidence of electrostatic discharge. Accordingly, in some embodiments, the graphene coating can advantageously overcoat an existing charge control coating upon a functional component of a spacecraft structure. The ability to overcoat an existing charge control coating can be advantageous from the standpoint of not having to remove the existing coating in the course of fabricating the functional component or the spacecraft structure. Hence, graphene-coated functional components can serve as essentially drop-in replacements for more conventional functional components. Materials that can be present in existing charge control coatings and that can be overcoated with a graphene coating include, for example, indium tin oxide and various metal films, such as gold or aluminum films. Existing charge control coatings that can be overcoated with graphene coatings also include nanomaterial-based charge control coatings such as carbon nanotubes, thin graphite films, nanowires, and nanoparticles. In some instances, such nanomaterials can also be incorporated in a graphene coating of the present disclosure. Alternately, such nanomaterials can also be incorporated with indium tin oxide or metal films in conventional charge control coatings. In still other embodiments, a graphene coating can be incorporated directly upon a functional component of a spacecraft structure, in which an additional charge control coating is not present.

As indicated above, one especially desirable feature of graphene coatings is their potential for high optical transparency in the visible region of the electromagnetic spectrum. Hence, incorporation of a graphene coating upon a functional component of a spacecraft structure is not particularly detrimental when receipt of electromagnetic radiation by the functional component is important for it to perform as intended (e.g., solar cells and solar panels). In more particular embodiments, graphene coatings suitable to mitigate sputtering erosion by energetic particles can simultaneously have characteristics such that they decrease optical transparency by about 10% or less, by about 15% or less, or by about 20% or less.

In further regard to the optical transparency, one having ordinary skill in the art will recognize that the greater the number of graphene layers in the graphene coating, the lower the optical transparency will be. However, thicker graphene coatings can provide a greater degree of electrical conductivity. In some embodiments, a single-layer graphene coating can be present upon the functional component and convey a sufficient degree of erosion resistance thereto, while also providing adequate electrical conductivity for charge management to be realized. In other various embodiments, graphene coatings of the present disclosure can contain between about 2 and about 10 graphene layers, or between about 2 and about 5 graphene layers, or between about 3 and about 8 graphene layers, or between about 5 and about 9 graphene layers. Each graphene layer has a thickness of about 0.34 nm, which corresponds to a thickness range of about 0.68 nm to about 3.4 nm for a graphene coating containing 2 to 10 graphene layers. In instances where optical transparency of the graphene coating is not required, thicker graphene layers can be incorporated, either by repeated CVD deposition, by repeated application of CVD-grown graphene, or by deposition of graphene flakes.

Various techniques can be utilized to incorporate the graphene coating upon the functional component of the spacecraft structure. In some embodiments, graphene within the graphene coating can be grown upon a surface of the functional component. For robust functional components that are not damaged by the high-temperature conditions typically used to prepare graphene, direct growth of graphene thereon can be particularly suitable. In other various embodiments, graphene within the graphene coating can be grown upon a secondary substrate and undergo subsequent transfer to the functional component as a conformal coating. In still other various embodiments, graphene can be produced from bulk graphite in a suitable manner, and the resulting graphene flakes can undergo subsequent transfer to the functional component as a conformal coating containing a plurality of graphene flakes. For example, graphene flakes produced from bulk graphite can be used to form a graphene coating in this manner. The latter two types of processes for producing a graphene coating upon a functional component can be particularly desirable when the functional component is unstable toward the conditions used to grow the graphene or if the surface of the functional component does not support direct growth of graphene thereon. Illustrative processes for producing graphene and, when necessary, transferring the graphene from a secondary substrate to a functional component are discussed in more detail hereinafter.

In some embodiments, plural sheets of single-layer graphene can be deposited consecutively upon a functional component to form a multi-layer graphene coating of increased thickness. In other embodiments, multi-layer graphene can be deposited directly in a graphene coating having an appropriate coating thickness. Multi-layer graphene coatings having a sufficient thickness to decrease or substantially preclude optical transparency can also be fabricated similarly. Thicker graphene coatings can also be fabricated by depositing a plurality of graphene flakes in the form of a thin film, as discussed further herein.

One scalable process for producing large-area graphene films involves depositing graphene on a suitable growth substrate, most commonly a copper or nickel substrate, by chemical vapor deposition (CVD) or plasma-enhanced chemical vapor deposition (PECVD) using reactant gases such as methane and hydrogen. In some instances, PECVD can be further enhanced with electron cyclotron resonance. Growth on ceramic substrates, such as silicon carbide, or glass substrates can also be realized in the presence of a suitable metal catalyst. Graphene grows epitaxially or non-epitaxially in these processes and firm adherence of the graphene to the growth substrate results.

CVD and PECVD growth processes are often not applicable to thermally or chemically sensitive surfaces, some of which can be present in one or more functional components of a spacecraft structure. In these cases, graphene can be grown on a secondary substrate and undergo subsequent transfer as a large-area graphene film to a functional component of a spacecraft structure. For example, graphene can be grown on a copper substrate, and the copper substrate can then be dissolved to free the intact graphene film for transfer to the surface of the functional component. Alternately, substrate-free graphene can be produced from bulk graphite, and a conformal coating containing discontinuous graphene flakes can be produced upon the surface of a functional component. Suitable techniques for producing graphene from bulk graphite include, for example, mechanical exfoliation and Hummer's method (i.e., reaction of graphene with $NaNO_2/KMnO_4$ in $H_2SO_4$, optionally with microwave treatment or thermal treatment). Hummer's method produces graphene oxide, which can then undergo subsequent chemical or thermal reduction to remove oxygenated functionalities and improve surface electrical conductivity of the graphene. In some embodiments, graphene oxide flakes produced from bulk graphite can be utilized in producing a graphene coating. In some embodiments, graphene oxide flakes can be reduced to form graphene flakes, which can then undergo deposition to form a graphene coating. In other embodiments, a deposited graphene oxide coating in flake form can be reduced directly upon a substrate to form a graphene coating containing graphene flakes having improved electrical conductivity. CVD-deposited graphene coatings can also undergo similar reduction processes to improve their surface electrical conductivity.

As indicated above, when graphene is not grown directly upon a functional component, the graphene can be transferred to the functional component as conformal coating, either as a large-area continuous sheet of graphene or as a plurality of discontinuous graphene flakes or particles. Both types of graphene can be suitable for incorporation upon various types of functional components according to the present disclosure. For example, single-layer or few-layer large-area graphene sheets can be desirable when optical transparency is an overriding concern. In some embodiments, the graphene can be incorporated within a silica sol and undergo deposition upon the functional component via spin coating. In other various embodiments, a solution or dispersion of the graphene in a solvent can be deposited via a technique such as spin coating, drop casting, solvent-induced precipitation, solvent evaporation, transfer printing, ink jet printing, electrophoretic printing, filtration on a membrane, or any combination thereof. The latter group of techniques can be particularly applicable for depositing graphene flakes as a conformal coating upon the functional component.

Accordingly, the present disclosure further provides methods for operating a spacecraft structure incorporating an electric propulsion system. In various embodiments, such operating methods can include generating an outflow of energetic particles from an electric propulsion system of a spacecraft structure, and at least partially impacting the outflow of energetic particles upon a functional component of the spacecraft structure, in which the functional component has a graphene coating thereon. Suitable spacecraft structures and further details regarding the graphene coating are provided hereinabove. As discussed herein, the graphene coating can provide advantageous effects when operating the spacecraft structure such as, for example, limiting sputtering erosion of the surface of the functional component or a protective coating thereon, as well as providing its own ESD protective effects due to electrical conductivity of the graphene.

In more particular embodiments, the spacecraft structure can be in an outer space environment when the outflow of energetic particles impacts the functional component. In some embodiments, the outflow of energetic particles can help maintain an orbital position of the spacecraft structure. In other various embodiments, the outflow of energetic particles can provide propulsion for transporting the spacecraft structure across vast distances.

Examples 0.008" thick AR cover glass slides (both ITO-coated and non-ITO coated) were obtained commercially. Silicon wafers with a gold coating were obtained either in-house or sourced commercially. The samples were all 1.5"×1.5" in size. Coating of the substrates with graphene was accomplished by growing the graphene on a copper substrate, dissolving the copper substrate, and transferring the free graphene film onto the sample substrates as a conformal coating. 6 non-ITO coated glass cover slides were coated with graphene. 2 ITO-coated glass cover slides were further coated with graphene upon the ITO coating. 4 gold-coated silicon substrates were further coated with graphene upon the gold coating.

The erosion behavior of the samples was assessed with a 3" beam test area generated from Xe ions having an energy ranging between 100 eV and 1500 eV. A beam energy of 150 eV at a 80-150 nA/mm² flux was most typically used. An exposure time of 2-8 hours was used.

Various tests were conducted for the graphene-coated samples against non-graphene-coated samples as controls. Optical transmission, Raman signature and surface conductivity were evaluated. Surface conductivity and Raman spectroscopy were measured both before and after exposure to the ion beam. Graphene-coated samples that were exposed to the ion beam were partially masked so that erosion from ion sputtering could be evaluated following ion exposure by profiling the change in sample height across the masked-to-unmasked zone. The various tests are described further hereinafter.

Optical Transmission:

Table 1 below summarizes the optical transmission properties for control glass slides either lacking or having an ITO coating. The control glass slides were not exposed to an ion beam prior to measurement.

TABLE 1

| Entry | Optical Transmission | | |
|---|---|---|---|
|  | 350-700 nm | 500-950 nm | 850-1800 nm |
| non-ITO Control 1 | 91.8% | 93.8% | 93.3% |
| non-ITO Control 2 | 89.9% | 92.2% | 92.0% |
| non-ITO Control Average | 90.9% | 93.0% | 92.7% |
| ITO Control | 92.2% | 93.6% | 92.7% |

Graphene from two different CVD batch runs was used to perform the coating of various ITO or non-ITO coated glass slides. The graphene from the first batch run was believed to be thicker than that of the second batch run, since the first batch run appeared darker to the naked eye. The graphene from the first batch run was used in Samples 1-4 below, and the graphene from the second batch run was used in Samples 5-8 (see Table 2 below). Table 2 below summarizes the optical transmission properties and the corresponding optical transmission loss percentages for various graphene-coated glass slides. The optical transmission loss percentage was measured relative to (normalized against) the transmission of the appropriate non-ITO or ITO-coated control.

TABLE 2

| | 350-700 nm | | 500-950 nm | | 850-1800 nm | |
|---|---|---|---|---|---|---|
| Entry | Optical Transmission | Optical Transmission Change | Optical Transmission | Optical Transmission Change | Optical Transmission | Optical Transmission Change |
| 1 (non-ITO) | 78.7% | −13.4% | 93.6% | −11.6% | 92.7% | −9.9% |
| 2 (non-ITO) | 80.4% | −11.5% | 82.2% | −9.8% | 83.5% | −8.3% |
| 3 (non-ITO) | 80.7% | −11.2% | 83.9% | −9.6% | 85.0% | −8.1% |
| 4 (ITO) | 78.5% | −14.9% | 84.1% | −12.5% | 82.9% | −10.6% |
| 5 (non-ITO) | 84.0% | −7.5% | 87.0% | −6.5% | 88.0% | −5.0% |
| 6 (non-ITO) | 83.6% | −8.0% | 86.7% | −6.8% | 87.8% | −5.2% |
| 7 (non-ITO) | 83.4% | −8.2% | 86.6% | −6.9% | 87.5% | −5.6% |
| 8 (ITO) | 83.8% | −9.1% | 86.7% | −7.4% | 87.3% | −5.8% |

As shown in Table 2, the graphene coating influenced the optical transmission properties only slightly for both types of glass slides. The higher transmission loss in samples 1-4 again suggests that the graphene from the first batch run was thicker than that of the second batch run, likely approximately double the thickness.

Pre-Exposure Surface Conductivity:

Surface conductivity measurements were made using a 4-point probe technique. Non-graphene coated samples had a pre-exposure surface resistivity of greater than $2 \times 10^7$ ohms/square. In contrast, the graphene-coated samples had much lower surface resistivity values. Before exposure to the ion beam, samples coated with the thicker graphene sheet from the first CVD batch run (see above, corresponding to samples 1-4) had an average surface resistivity value of approximately 1400 ohms/square, whereas samples coated with the thinner graphene sheet from the second CVD batch run (corresponding to samples 5-8 above) had higher resistivity values of approximately $1 \times 10^6$ ohms/square, almost 1000 times higher. Due to various challenges in obtaining accurate surface resistivity measurements, particularly the small sample size, the above values are considered to represent a relative indicator of the surface resistivity change that occurs rather than an absolute measure of the surface resistivity that can be obtained. In all cases, however, the surface resistivity values were below $1 \times 10^9$ ohms/square, which is a value considered to be an effective threshold for charge-dissipating conductivity.

Post-Exposure Erosion Profile:

Gold-coated samples were masked and then exposed to the Xe beam for a period of time. Testing conditions and results are shown in Table 3. For each uncoated sample (i.e., lacking graphene), there was approximately a 1000 Angstrom step in coating height between masked and unmasked regions. In contrast, for the graphene-coated samples, there was no discernible step. The corresponding erosion profilometry plots are not shown herein.

TABLE 3

| Sample | Graphene Coating? | Flux (nA/mm$^2$) | Time (hr) | Fluence (nA * hr/mm$^2$) | Erosion Behavior |
|---|---|---|---|---|---|
| Gold | Yes | 110 | 3 | 330 | Non-detectable |
| Gold | No | 90 | 4 | 360 | ~1000 Å |
| Glass (non-ITO) | Yes | 115 | 3 | 345 | Non-detectable |
| Glass (ITO) | Yes | 115 | 3 | 345 | Non-detectable |
| Glass (ITO) | No | 115 | 3 | 345 | ~1000 Å |

Figure 2:
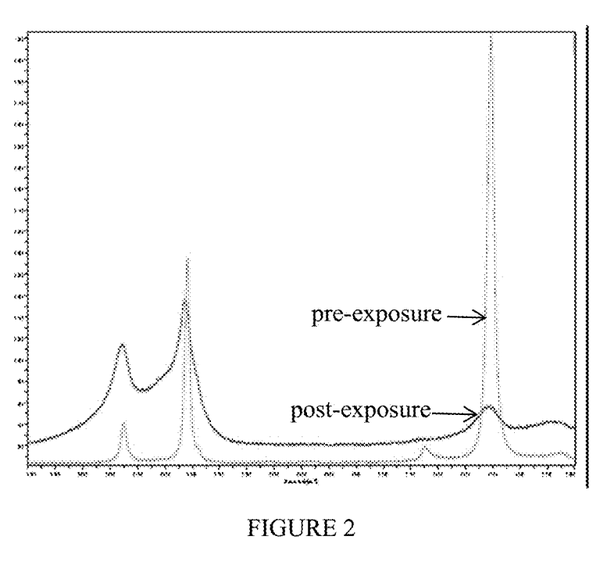
FIG. 2 shows a comparative Raman spectrum of graphene on an ITO-coated glass slide, both pre- and post-exposure to high-energy Xe ions.

FIG. 2 shows a comparative Raman spectrum of the graphene on an ITO-coated glass slide, both pre- and post-exposure. The peaks at 1600 and 2700 wavenumbers show that the graphene or graphene-like structure was maintained post-exposure, although some disorder was introduced by exposure to Xe ions.

Post-Exposure Surface Conductivity:

Following exposure to Xe ions, surface conductivity values for the samples were again measured by a four-point probe technique. The ion fluence for these samples was 333 nA*hr/mm$^2$ at an ion energy of 150 eV. Uncoated ITO-glass samples had a surface resistivity of >1×10$^9$ ohms/square. An ITO glass sample coated with the thinner graphene film had surface resistivity values of 50,000 ohms/square and 500,000 ohms/square in its masked and unmasked regions, respectively. An ITO glass sample coated with the thicker graphene film had surface resistivity values of 3,000 ohms/square and 500,000 ohms/square in its masked and unmasked regions, respectively. Similarly, a non-ITO glass sample coated with the thicker graphene film had surface resistivity values of 3,000 ohms/square and 5,000,000 ohms/square in its masked and unmasked regions, respectively. Although the surface resistivity values increased upon ion exposure, the post-exposure values were well below those of the corresponding samples not coated with graphene, and sufficient surface conductivity was still maintained to promote effective charge dissipation. Accordingly, these results show that, although some amount of alteration occurred with ion sputtering, sufficient material remained to maintain an acceptable degree of surface conductivity.

Although the disclosure has been described with reference to the disclosed embodiments, those skilled in the art will readily appreciate that these only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A spacecraft structure comprising:
   an electric propulsion system, wherein the electric propulsion system comprises one or more exhaust source points;
   a functional component, wherein at least one of the one or more exhaust source points is pointed toward the functional component to direct at least a portion of an outflow of the electric propulsion system to impact the functional component; and
   a graphene coating upon the functional component, wherein the graphene coating overcoats an existing charge control coating upon the functional component.

2. The spacecraft structure of claim 1, wherein the functional component is selected from the group consisting of a solar panel, an optical solar reflector, a radiofrequency reflector, a gold mesh reflector, a solar array, a communication array, an antenna, an optical sensor, a thermal blanket, and any combination thereof.

3. The spacecraft structure of claim 1, wherein the existing charge control coating comprises indium tin oxide or a metal film.

4. The spacecraft structure of claim 1, wherein at least a portion of the graphene coating comprises single-layer graphene.

5. The spacecraft structure of claim 1, wherein the graphene coating comprises a plurality of graphene flakes.

6. The spacecraft structure of claim 1, wherein the graphene coating decreases optical transparency by about 10% or less.

7. The spacecraft structure of claim 1, wherein graphene comprising the graphene coating is grown upon a surface of the functional component.

8. The spacecraft structure of claim 1, wherein graphene comprising the graphene coating is grown upon a secondary substrate and is subsequently transferred to the functional component as a conformal coating.

9. The spacecraft structure of claim 1, wherein the spacecraft structure comprises a satellite.

10. A method comprising:
    generating an outflow of energetic particles from an electric propulsion system of a spacecraft structure, the electric propulsion system comprising one or more exhaust source points; and
    pointing at least one of the one or more exhaust source points toward a functional component to direct at least a portion of the outflow toward the functional component to impact the functional component, the functional component having a graphene coating thereon,
    wherein the graphene coating overcoats an existing charge control coating upon the functional component.

11. The method of claim 10, wherein the functional component is selected from the group consisting of a solar panel, an optical solar reflector, a radiofrequency reflector, a gold mesh reflector, a solar array, a communication array, an antenna, an optical sensor, a thermal blanket, and any combination thereof.

12. The method of claim 10, wherein the existing charge control coating comprises indium tin oxide or a metal film.

13. The method of claim 10, wherein at least a portion of the graphene coating comprises single-layer graphene.

14. The method of claim 10, wherein the graphene coating comprises a plurality of graphene flakes.

15. The method of claim 10, wherein the graphene coating decreases optical transparency by about 10% or less.

16. The method of claim 10, wherein graphene comprising the graphene coating is grown upon the functional component.

17. The method of claim 10, wherein graphene comprising the graphene coating is grown upon a secondary substrate and is subsequently transferred to the functional component as a conformal coating.

* * * * *